(12) United States Patent
Kowald et al.

(10) Patent No.: US 7,721,311 B2
(45) Date of Patent: May 18, 2010

(54) DISPLAYING EPG INFORMATION ON A DIGITAL TELEVISION

(75) Inventors: Julie Rae Kowald, Dundas Valley (AU); Neil Eric Carlyle, Bayview (AU); Joseph Anthony Thurbon, Leichhardt (AU); Margaret Hanna, Gladesville (AU)

(73) Assignee: Canon Kabushiki Kaisha, Tokyo (JP)

( * ) Notice: Subject to any disclaimer, the term of this patent is extended or adjusted under 35 U.S.C. 154(b) by 1303 days.

(21) Appl. No.: 11/203,195

(22) Filed: Aug. 15, 2005

(65) Prior Publication Data

US 2006/0066755 A1 Mar. 30, 2006

(30) Foreign Application Priority Data

Sep. 24, 2004 (AU) .............................. 2004905551

(51) Int. Cl.
H04N 5/445 (2006.01)
(52) U.S. Cl. .............................. 725/52; 725/44; 725/56
(58) Field of Classification Search .................. 725/44, 725/52, 56
See application file for complete search history.

(56) References Cited

U.S. PATENT DOCUMENTS

| | | | | |
|---|---|---|---|---|
| 5,532,754 | A | 7/1996 | Young et al. | 725/47 |
| 5,682,511 | A * | 10/1997 | Sposato et al. | 715/716 |
| 5,886,697 | A * | 3/1999 | Naughton et al. | 345/473 |
| 6,211,921 | B1 * | 4/2001 | Cherian et al. | 348/565 |
| 6,281,940 | B1 * | 8/2001 | Sciammarella | 348/564 |
| 6,411,337 | B2 * | 6/2002 | Cove et al. | 348/563 |
| 6,445,398 | B1 | 9/2002 | Gerba et al. | 715/721 |
| 6,448,987 | B1 * | 9/2002 | Easty et al. | 715/834 |
| 6,452,597 | B1 * | 9/2002 | Goldberg et al. | 345/472 |
| 6,473,751 | B1 * | 10/2002 | Nikolovska et al. | 707/3 |
| 6,857,128 | B1 * | 2/2005 | Borden et al. | 725/39 |
| 7,036,091 | B1 * | 4/2006 | Nguyen | 715/834 |
| 2003/0106057 | A1 * | 6/2003 | Perdon | 725/45 |
| 2005/0010955 | A1 * | 1/2005 | Elia et al. | 725/88 |
| 2005/0015804 | A1 * | 1/2005 | LaJoie et al. | 725/44 |
| 2005/0028198 | A1 * | 2/2005 | Robbins | 725/39 |
| 2005/0097604 | A1 * | 5/2005 | Shintani et al. | 725/44 |
| 2005/0154988 | A1 * | 7/2005 | Proehl et al. | 715/720 |

FOREIGN PATENT DOCUMENTS

JP 2003-158689 5/2003

* cited by examiner

*Primary Examiner*—Andrew Y Koenig
*Assistant Examiner*—Junior O Mendoza
(74) *Attorney, Agent, or Firm*—Fitzpatrick, Cella, Harper & Scinto

(57) ABSTRACT

Disclosed is a method for displaying a plurality of objects on a display (105). Each object has at least a first attribute and a second attribute. The method sets a range of first attributes to be displayed. A set of objects is then displayed having the same second attribute on a radial line of an ellipse based on a comparison between the range and the first attribute of the objects. Desirably the method is used for displaying information regarding a plurality of broadcast programs on the display, each broadcast program having attributes comprising at least time of transmission and channel of transmission. In that implementation a display period is set. The method then compares the time of broadcast transmission of one or more programs with the display period and then displays (eg. 600) information regarding a set of programs (602, 604, 606) having the same channel of transmission (eg. 12) on at least one radial line of an ellipse, based on the comparison. The described arrangements are particularly useful in displaying television electronic program guide (EPG) information.

2 Claims, 11 Drawing Sheets

DISPLAYING EPG INFORMATION ON A DIGITAL TELEVISION

CROSS-REFERENCE TO RELATED PATENT APPLICATION

This application claims the right of priority under 35 U.S.C. §119 based on Australian Patent Application No. 2004905551, filed 24 Sep. 2004, which is incorporated by reference herein in its entirety as if fully set forth herein.

FIELD OF THE INVENTION

The present invention relates to electronic program guides and, in particular, to a graphical user interface for at least one of displaying, navigating, and selecting programs from an electronic program guide.

BACKGROUND

When viewing broadcast television programs, for example upon a digital television set, a viewer often desires information about forthcoming programs in order to plan future viewing. Such program information may be supplied to the digital television in an electronic form known as an Electronic Program Guide (EPG). An EPG includes program information contained in a file or data stream with a known format, which can be parsed and presented to the viewer as a visual display. The viewer may then navigate the visual display using a remote control device to find or identify program information and issue commands to the television.

The EPG can, in principle, contain information about an unlimited number of channels and programs for broadcast by each channel. Presenting all the available program data to the viewer on a single display screen is impractical, as the information may need to be rendered in a size too small to be readily understood. Further, the simplicity of the typical remote control interface limits the ability of the viewer to interact with the display, which can make the task of navigation tedious and unpleasant.

Current EPG displays present a subset of the information to the viewer in a linear arrangement that may be scrolled by the viewer using simple "Up" and "Down" controls to uncover or reveal the content of the EPG not presently displayed (so-called "off-screen content"). Such linear scrolling is visually monotonous and can quickly exhaust the viewer's patience. Moreover, the viewing display of a digital television can vary widely in size and aspect ratio, and the typical linear display is unable to adapt to these different conditions. A need therefore exists for a visually interesting yet readily comprehensible manner of presenting the program information obtained from an EPG that is adaptable to different classes of consumer digital television displays. Such a presentation is desirable to be easily navigable by the simple controls of the typical remote control.

SUMMARY OF THE INVENTION

In accordance with one aspect of the present invention there is disclosed a method for displaying a plurality of objects on a display, each said object comprising at least a first attribute and a second attribute, said method comprising the steps of:

(a) setting a range of first attributes to be displayed on the display; and (b) displaying on the display a set of objects having the same second attribute on a radial line of an ellipse based on a comparison between the range and the first attribute of one or more said objects.

In accordance with another aspect of the present invention there is disclosed a method for displaying information regarding a plurality of broadcast programs on a display, each said broadcast program having attributes comprising at least time of transmission and channel of transmission, said method comprising the steps of:

(a) setting a display period; (b) comparing the time of broadcast transmission of one or more programs with the display period; and (c) displaying a set of programs having the same channel of transmission on at least one radial line of an ellipse, based on said comparison.

In accordance with another aspect of the present invention there is disclosed a method for displaying information regarding a plurality of broadcast programs on a display, each said broadcast program having attributes comprising at least time of transmission and channel of transmission, said method comprising the steps of:

(a) setting a display period; (b) comparing the time of transmission of one or more programs with the display period; (c) displaying a set of programs having the same channel of transmission on a radial line of an ellipse, based on said comparison; (d) replacing said set of programs displayed on a radial line with a further set of programs displayed on an adjacent radial line in response to a first viewer command; (e) altering the display period in response to a second viewer command;

(f) repeating steps (b) and (c); and (g) selecting a displayed program for further action.

Other aspects of the present invention are also disclosed.

BRIEF DESCRIPTION OF THE DRAWINGS

At least one embodiment of the present invention will be described with reference to the accompanying drawings in which.

DETAILED DESCRIPTION INCLUDING BEST MODE

Figure 1:
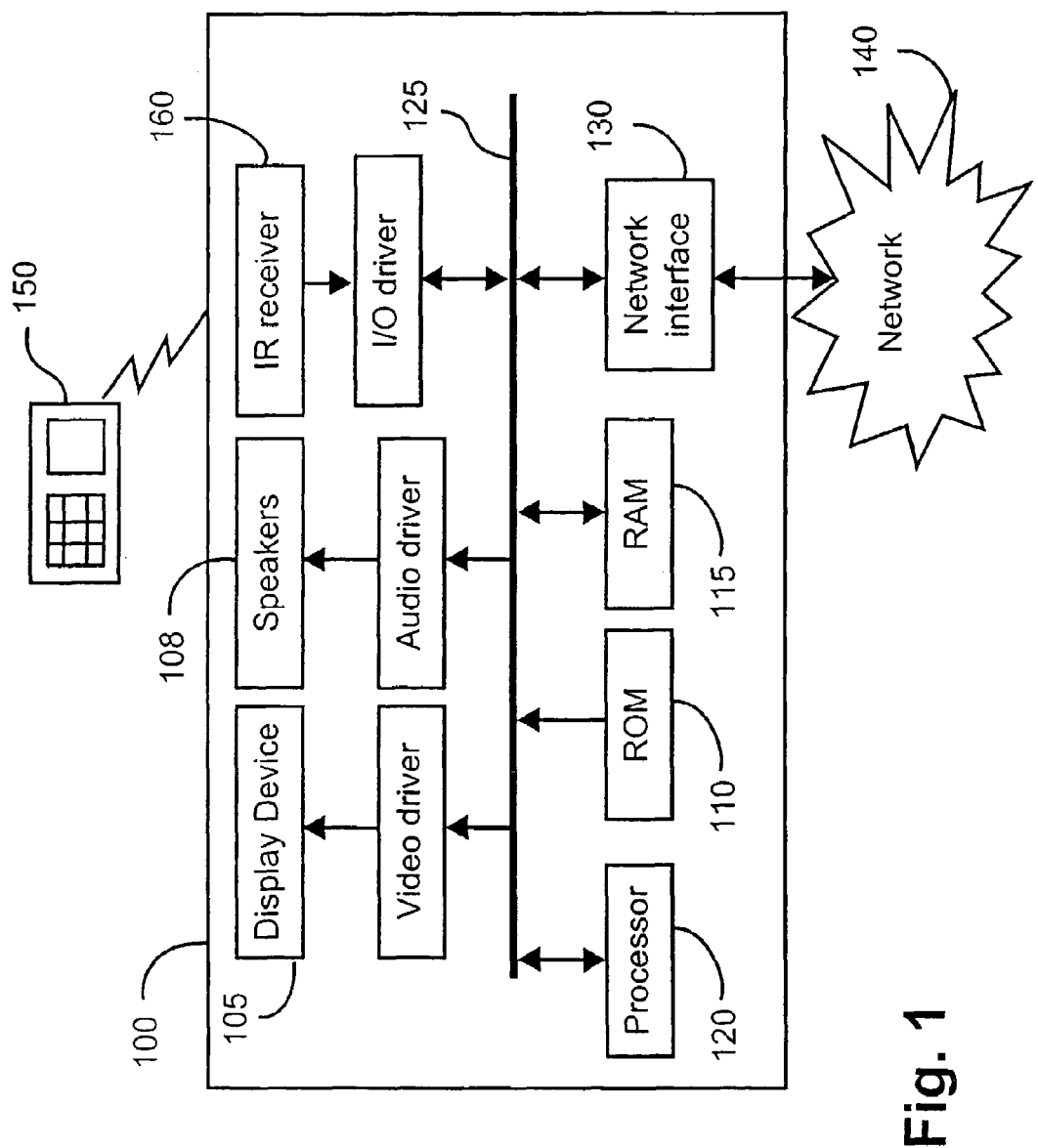
FIG. 1 shows a schematic representation of a digital television on which the display methods to be described may be practised.

Disclosed are EPG display and navigation methods that are preferably implemented as one or more software modules running on a digital television set, or receiver as such are sometimes known. Such a television 100 is depicted schematically in FIG. 1. The digital television 100 is formed by a display device 105 which may be formed by a cathode ray tube, LCD panel or plasma display. The television 100 further includes audio speakers 108, an infra-red (IR) receiver 160, a read-only memory (ROM) device 110, a random-access memory (RAM) device 115, and a network interface 130 (e.g. a cable modem), all functionally connected to and under control of a processor 120 by means of an interconnecting bus 125. The display device 105, audio speakers 108, and infrared (IR) receiver 160 are connected to the bus 125 via respective driver modules. A wireless remote control 150 which is operated by a user (or "viewer") viewing images represented on the display device 105 communicates with the digital television 100 through the IR receiver 160. The digital television 100 preferably obtains EPG information via the network interface 130 from a communications network 140. The network 140 is typically a cable television network, a broadcast network such as broadband (high-speed) Internet or satellite network, or a traditional Internet (low-speed) non-broadcast connection. The EPG information is received in a data stream that is parsed into program "metadata" as shown in Table 1. The TV programs themselves (ie. the programme material) may also be supplied, for example in a broadcast fashion, over the communications network 140. Alternatively, the programs may be supplied separately from the EPG data, for example wirelessly via an aerial and corresponding receiver module (not shown).

An alternative implementation is one or more software modules running on a digital Set-Top Box (STB), which is very similar to the digital television 100 of FIG. 1 except that the display 100 and speaker 108 functions are handled by a separate independent device (display screen and loudspeakers).

Figure 2:
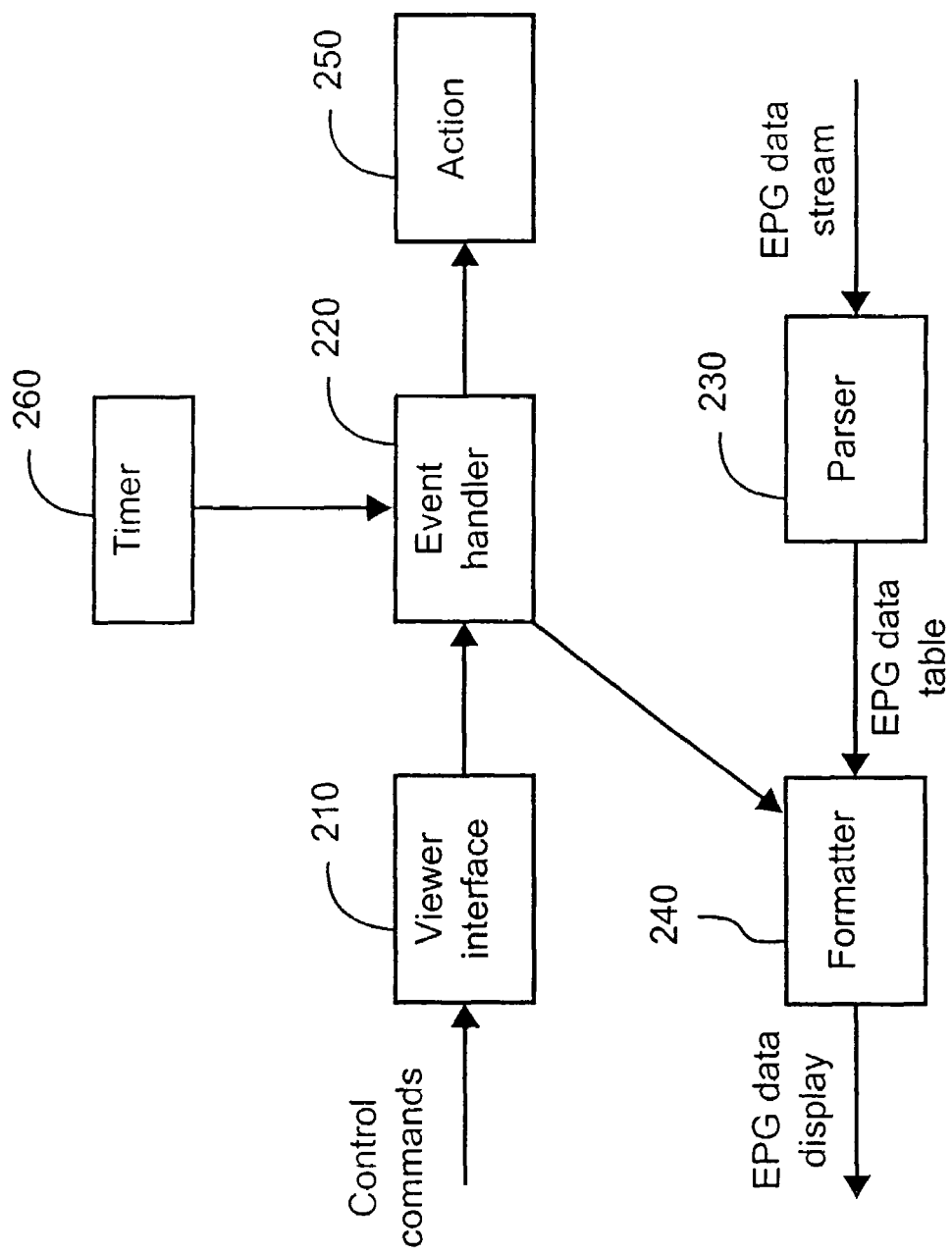
FIG. 2 depicts the interaction of various software modules used to implement the display methods.

The software controlling the digital television 100 is preferably stored in the ROM 110 and is executed by the processor 120. The software may be conceptually divided into several modules according to functionality, as shown in FIG. 2. A viewer interface module 210 receives commands from the remote control 150 and passes them to an event handler module 220, which interprets the commands and in turn forwards them to other modules depending on the action requested. A parser module 230 continuously or periodically receives the program information in the EPG data stream, parses the information into the tabular form shown in Table 1, which is subsequently stored in the RAM 115. Table 1 shows an example of EPG information in tabular form, includes a list of programs with accompanying descriptive fields. These fields include at least:

(i) Program title;

(ii) Program date;

(iii) Program start time;

(iv) Program end time; and (v) Channel of broadcast.

In some cases, the field can include additional metadata such as:

(vi) Summary information

TABLE 1

| Title | Date | Start time | End time | Channel | Summary |
| --- | --- | --- | --- | --- | --- |
| Just Shoot Me | 12 November | 8 p.m. | 8:30 p.m. | 25 | Comedy, In this episode . . . |
| The Late Show | 12 November | 11 p.m. | 12 a.m. | 25 | Variety. David Letterman presents . . . |
| Charlie's Angels | 12 November | 9 p.m. | 11 p.m. | 12 | Movie. The Angels investigate . . . |
| Soccer | 12 November | 7 p.m. | 8 p.m. | 17 | Sport. Weekly highlights of world soccer. |

Some EPG systems provide program duration instead of end time. In this case, simply adding duration to start time gives program end time. Further, whilst the time above are indicated in 12 hour AM-PM format, such may alternated be presented in 24-hour format (e.g. from 0001-2359).

The viewer interface module 210 receives an "EPG display" command from the viewer, typically signalled by the press of an appropriate button on the remote control 150. The event handler 220 prompts a formatter module 240 to format the EPG information into a graphical representation to be displayed on the display device 105 in accordance with the process described with reference to FIG. 3. In one implementation, the graphical representation of the EPG data is displayed superimposed on the broadcast television pictures received from the channel to which the television 100 is currently tuned. Alternatively, the graphical representation can be displayed superimposed upon a neutral background referred to herein as a "blue screen". The graphical representation may be referred to as the "EPG display" being that image reproduced to the viewer by the display device 105.

Figure 9:
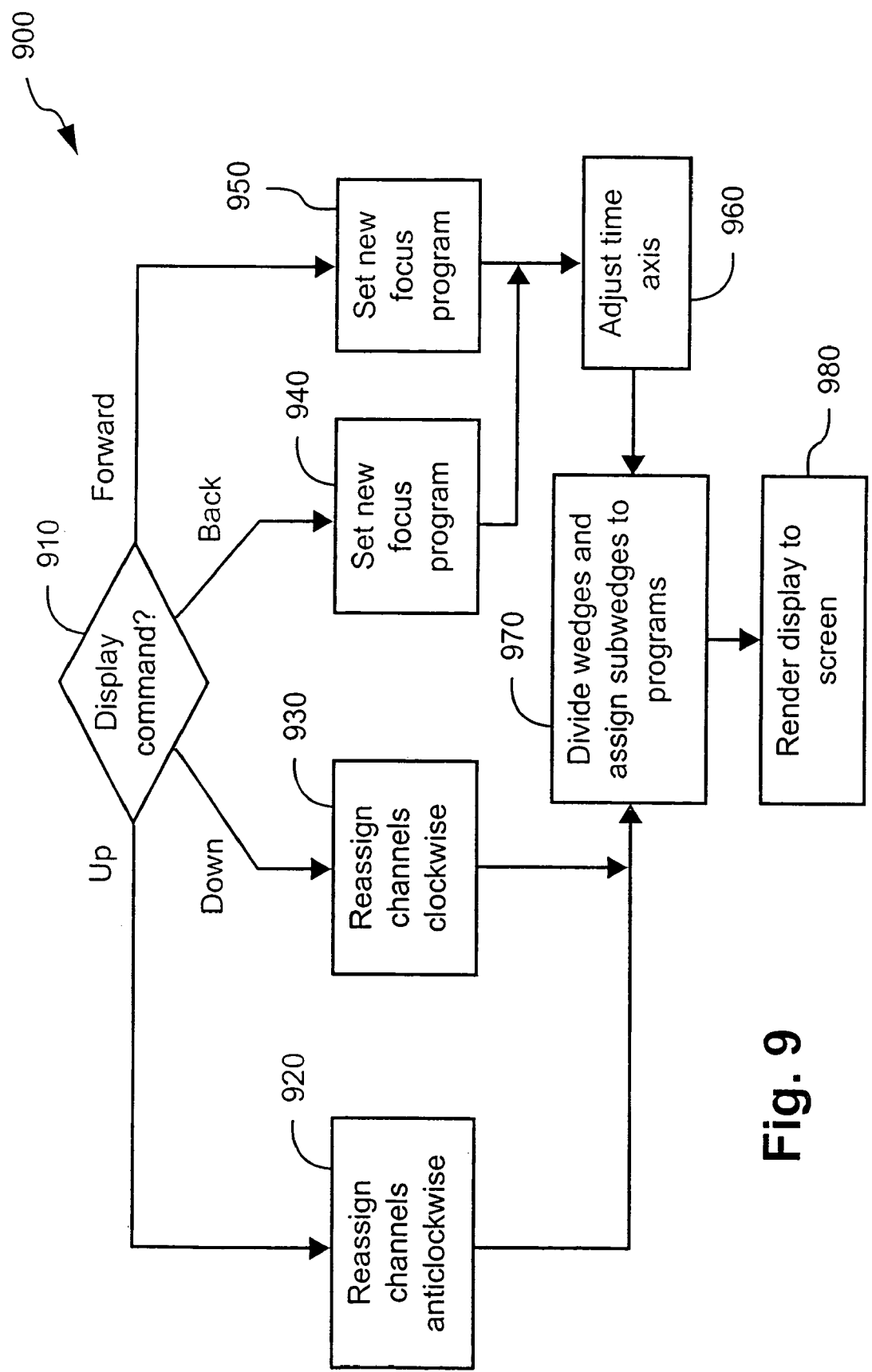
FIG. 9 is a flowchart depicting a method of altering the EPG data display in response to viewer display commands.

The formatter module 240 then waits in "standby mode" until further viewer commands relayed via the event handler 220 are received and adjusts the graphical representation in accordance with the process described with reference to FIG. 9. If the viewer requests an action with respect to a particular program, the event handler module 220 forwards the request to the Action module 250, which controls the settings of the television 100 in accordance with the action requested by the viewer. Such actions might include view, record, or remind the viewer that the program is imminent.

To give the viewer a visual representation of the programs that includes the progression of time whilst in "standby mode", the formatter 240 animates the programs progressing through elapsed time by updating the EPG screen elements on receipt of timing events from a timer module 260 via the event handler 220. Quick decisions by the viewer can then be made about which program to select based on whether a program is about to start, about to end or is halfway through the broadcast. A timer-triggered update method is described below with reference to FIG. 13.

A method 300 of formatting the EPG information into a graphical representation for display, carried out by the formatter module 240, stored in ROM 110 and executed by the processor 120, is now described with reference to FIG. 3.

Figure 12:
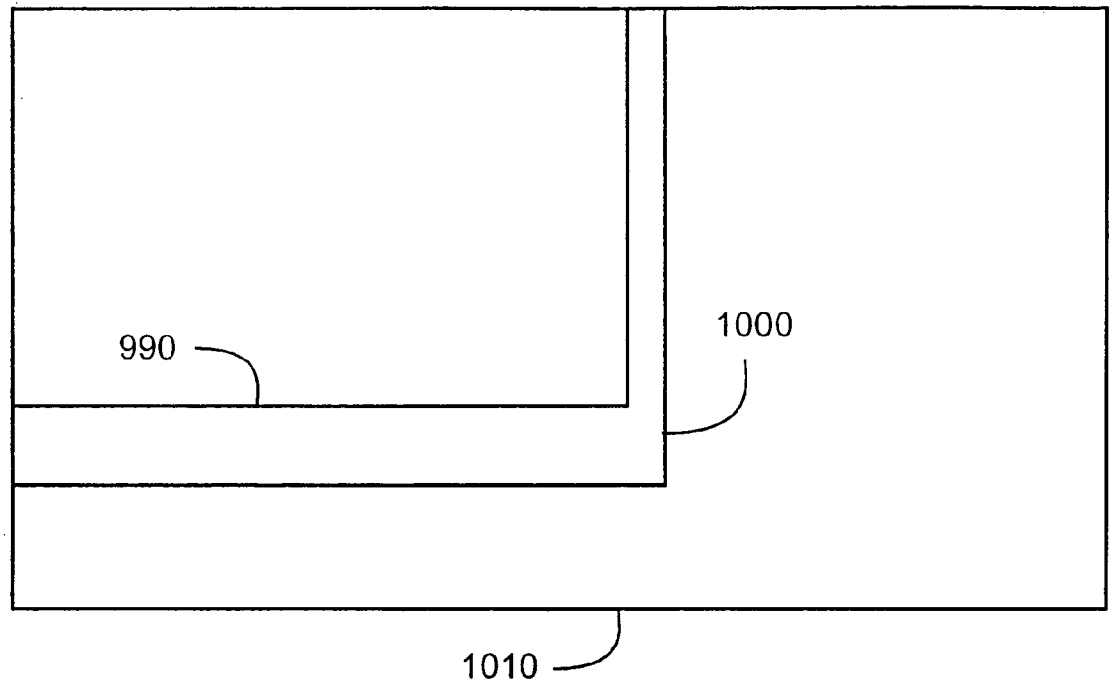
FIG. 12 illustrates three exemplary display classes.

In a first step 310 of the method 300, the formatter module 240 obtains the currently prevailing values of the relevant screen properties, namely the number H of rows (scanlines) and number W of pixels per row. In step 320 the module sets a variable Range_1b to half the number of rows of the display, rounded to the nearest integer. In the following step 325, the display class of the screen is determined using the aspect ratio of the screen (the number of pixels per line divided by the number of lines). With reference to FIG. 12, display classes may include for example:

(i) HDTV or "widescreen" 1010 having 1280×720 pixels;
(ii) PAL Square Pix or "normal" 1000 having 768×576 pixels; or
(iii) NTSC Wide Screen 990 having 720×480 pixels, to name but a few. The aspect ratios A of these three classes are 16/9, 4/3, and 3/2 respectively.

Figure 4A:
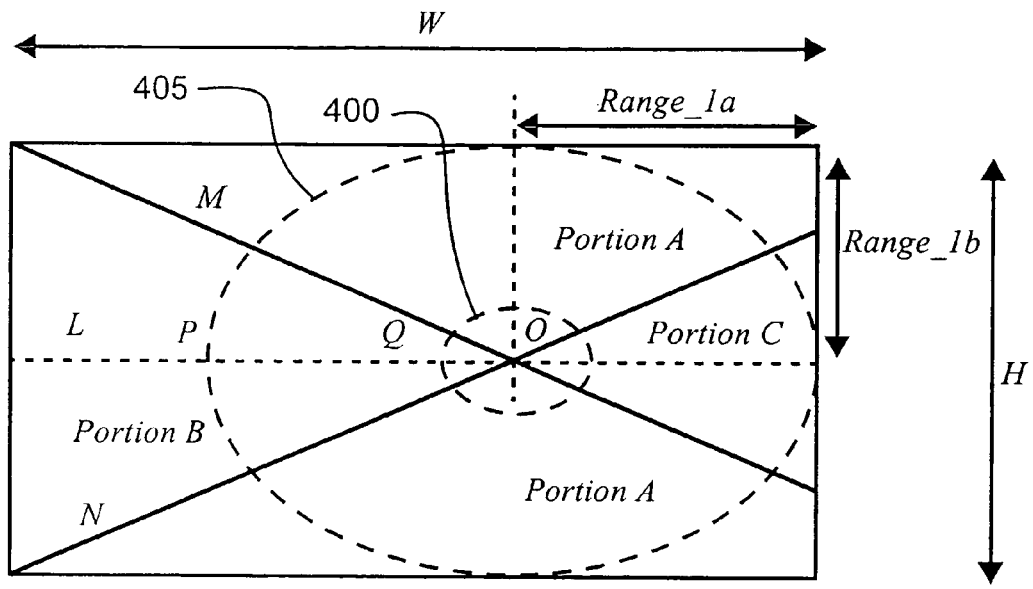
FIG. 4A illustrates the ellipses constructed according to the method of FIG. 3.

Following step 325, in step 330 the formatter module 240 constructs an (outer) ellipse 405 and, where desired, one or more concentric and like-orientated inner ellipses 400, with parameters that depend on the display class. For example the construction may involve the concentric ellipse centre O being placed as shown in FIG. 4A, positioned Range_1b pixels from the top of the screen and Range_1a pixels from the right edge. The outer ellipse 405 is then constructed with its major (horizontal) axis equal to Range_1a and its vertical, or minor, axis equal to Range_1b, so that the screen top, bottom and right edges are tangents to the ellipse. The eccentricity e of the ellipse is therefore equal to the ratio of Range_1a to Range_1b. This reveals a desired unoccupied display space to the left of the outer ellipse 405. If the eccentricity of any ellipse becomes unity (ie. a ratio of 1), that ellipse reduces to be a circle.

For the widescreen case, the value of e is set to yield the desired amount of unoccupied display space to the left of the ellipse, namely an "unoccupation" factor u times the screen width. In the widescreen display class, the unoccupation factor u is preferably 1/3, requiring eccentricity e to be 32/27 and therefore Range_1a=427 pixels. For the other two display classes listed above (normal, and NTSC widescreen) the preferred values of e (68/63 and 47/42, giving Range_1a=311 and 269 pixels respectively) are obtained by linear interpolation based on the preferred unoccupation factor of u=0 for a square display.

The radii of the inner ellipse 400 are set to a fixed fraction $1/\rho$ of the radii of the corresponding radii of the outer ellipse 405. In each display class, $\rho$ is preferably set to 4. The inner and outer ellipses 400 and 405 for the widescreen case are shown in FIG. 4A.

In step 335, a point P, seen in FIG. 4A, is constructed as the intersection between the outer ellipse 405 and a line L running horizontally to the left from the centre O. The line L represents the time axis, with leftward indicating the past and rightward indicating the future direction. The point P represents a "focus time" T, which is set by default to the present time, being the real-time at which the EPG is displayed to the user. The point Q is constructed as the intersection between the inner ellipse 400 and the line L. Two further lines are constructed in the step 335, those being a line M running through the centre O to the top left corner of the screen, and a line N that runs through the centre O to the bottom left corner of the screen. Together, these lines define three portions of the display, being:

(i) Portion A, which comprises the area above line M and the symmetrically opposite area below line N in the portion of the screen to the left of O, and the area above line N and the symmetrically opposite area below line M in the portion of the screen to the right of O;

(ii) Portion B, which comprises the area below line M and above line N in the portion of the screen to the left of O; and (iii) Portion C, which comprises the area below line N and above line M in the portion of the screen to the right of O.

Figure 4B:
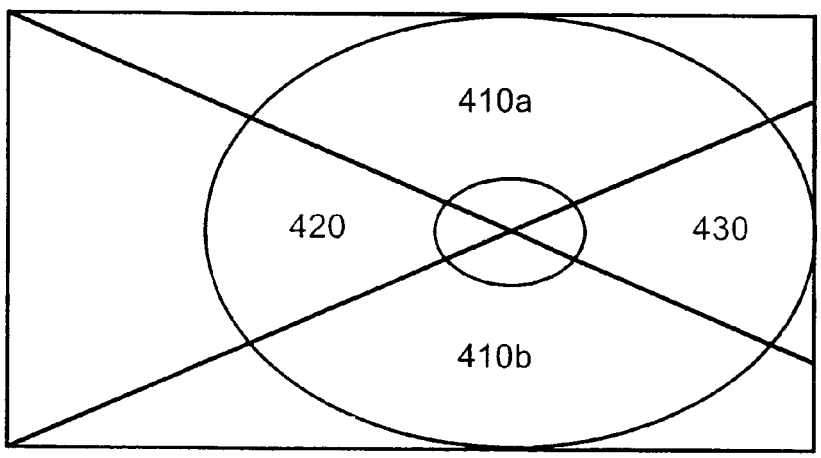
FIG. 4B illustrates the regions constructed according to the method of FIG. 3.

FIG. 4B shows the principal regions of the display for graphical representation of EPG information based on the construction shown in FIG. 4A. The wedge-shaped parts 410a and 410b of Portion A lying within the outer ellipse are collectively known as the "succession region 410". The wedge-shaped part 420 of Portion B lying within the outer ellipse is known as the "focus region". The wedge-shaped part 430 of Portion C lying within the outer ellipse is known as the "vacant region".

Following step 335, in step 340 the formatter module 240 computes an initial number Y of wedges into which to divide the focus region 420. The actual number of wedges displayed depends on the available program listings obtained from the EPG, as described later. This value is derived from the maximum permissible value Ymax, which is calculated depending on the display class as follows.

Hereafter in this specification, positive-valued angles around the ellipses 400 and 405 are measured clockwise from the line OP. The focus region 420 ranges from angle $-\theta$ to $\theta$ degrees, where $\theta$ is given by $$\theta = \tan^{-1}\left(\frac{\text{Range\_1}b}{W - \text{Range\_1}a}\right) \quad (1)$$

Using the values above, the values of $\theta$ for the three display classes are:
Widescreen: 22.9 degrees
Normal: 32.2 degrees
NTSC widescreen: 28.0 degrees.

The focus region 420 is evenly divided into wedges by angle, so the wedge angle $\Delta\theta$ in the focus region 420 is $2\theta/Y$ degrees, and the angular range of wedge y (y=1 to Y) in the focus region 420 is given by Range(y)=[$-\theta+(y-1)\Delta\theta, -\theta y\Delta\theta$].

If Y is odd, wedge (Y+1)/2 within the focus region symmetrically straddles the horizontal time axis L (where $\theta$=0).

To ensure legibility of text at the typical viewing distance, a minimum font size of 24 points must be observed for characters from the Roman alphabet, regardless of the display class. A different minimum font size may be used for other alphabets. At a typical monitor resolution of 48 lines per inch (approx. 19 lines per centimetre), this equates to 16 lines of height. The wedge that requires greatest legibility is the central wedge (y=(Y+1)/2) in the focus region 420. The height of the central wedge in pixels at the outer ellipse is approximately Range_1a*$\Delta\theta$, which is preferably large enough to accommodate at least two lines of text, so the constraint on the central wedge is Range_1a×$\Delta\theta \geq 16 \times 2$ (2)

Given the above formulae for $\Delta\theta$ and Range_1a, and a safety factor of two, this constraint sets an upper limit Ymax on Y as $$Y\max = \frac{H e \theta}{16 \times 4} \quad (3)$$

where H is the number of lines in the display, and $\theta$ is measured in radians.

Using the values given above, the values of Ymax for the three display classes are:
Widescreen: Ymax=5.33
Normal: Ymax=5.46
NTSC widescreen: Ymax=4.09.

Figure 3:
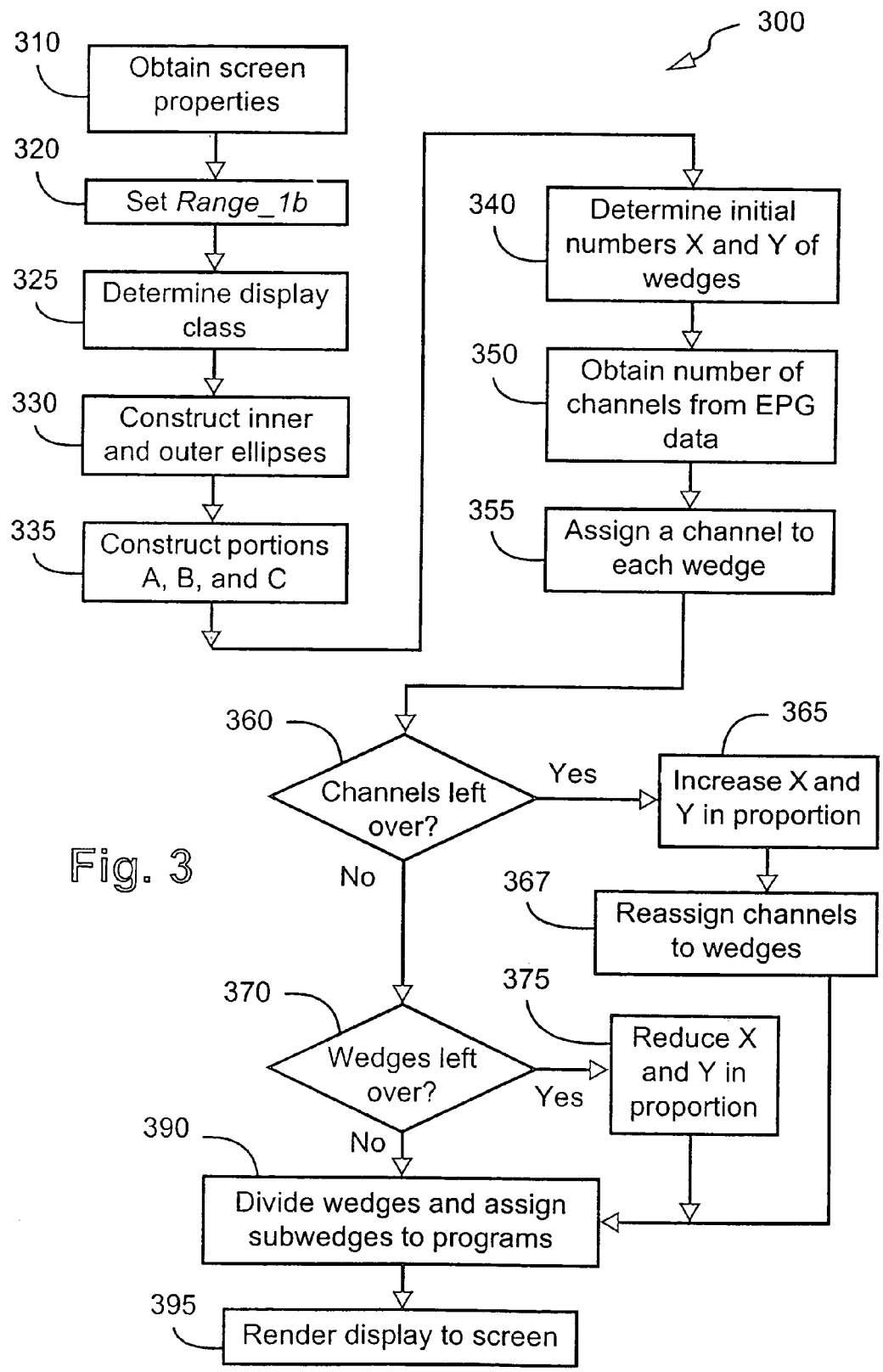
FIG. 3 is a flow chart depicting a method of formatting EPG data into a graphical display.

In step 340 of FIG. 3, Y is preferably set to be half Ymax, rounded up to the nearest odd number, which in each display class above evaluates to three.

The succession region 410 is preferably evenly divided into X wedges, so the wedge angle $\Delta\alpha$ is $(360-4\theta)/X$ degrees, and the angular range of wedge $x$ ($x=1$ to $X/2$) in the upper part of the succession region 410 is given by Range($x$)=[$\theta+(x-1)\Delta\alpha, \theta+x\Delta\alpha$].

In the lower part of the succession region 410 ($x=X/2+1$ to X), the angular range of wedge $x$ is given by Range($x$)=[$3\theta(x-1)\Delta\alpha, 3\theta+x\Delta\alpha$].

Xmax is preferably set by requiring the wedge angle $\Delta\alpha$ in the succession region 410 to be equal to that in the focus region 420, $\Delta\theta$. This implies that X and Y are in a constant ratio:

$$\frac{X}{Y} = \frac{360-4\theta}{2\theta} \qquad (4)$$

Using the values given above, the values of X/Y, and therefore Xmax, for the three display classes are:

Widescreen: X/Y=5.86; Xmax=31.2
Normal: X/Y=3.59; Xmax=19.6
NTSC widescreen: X/Y=4.43; Xmax=18.1.

X is preferably set initially to the initial value of Y, multiplied by the above ratios and rounded to the nearest even number, which evaluates to 18, 10, and 14 respectively for the three display classes.

Figure 5:
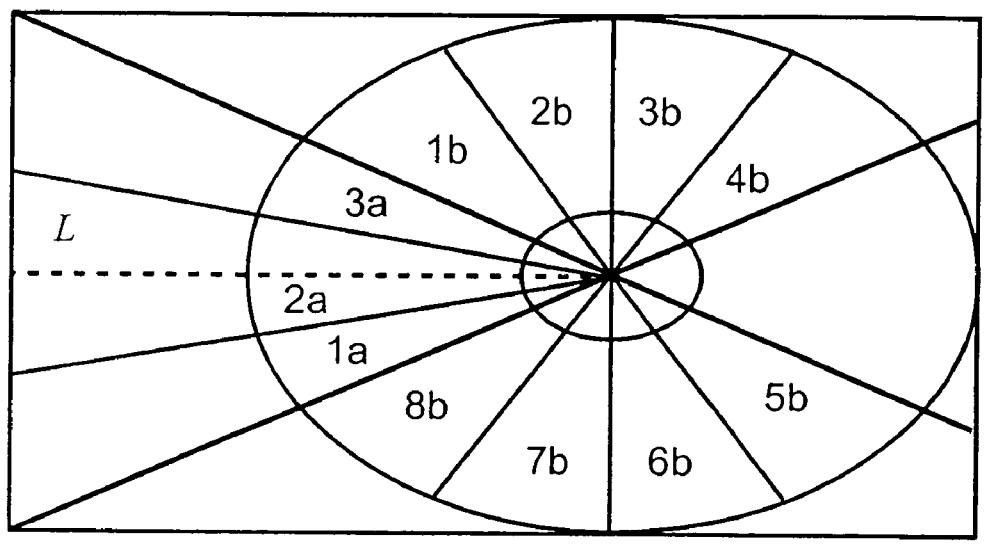
FIG. 5 illustrates the division of the ellipses into wedges according to the method of FIG. 3.

FIG. 5 shows the numbering of wedges in the focus region 420 and the succession region 410 for the widescreen display class, for an example in which Y=3 and X=8. Wedges numbered 1$a$ to 3$a$ in FIG. 5 belong to the focus region 420 while wedges numbered 1$b$ to 8$b$ belong to the succession region 410.

In all subsequent steps where X or Y is adjusted, Y is preferably maintained to be an odd number, whereas X is preferably maintained to be even. Moreover, approximately the above ratios between X and Y are preferably preserved.

In an alternative implementation, wedges in the succession region 410 are set to be of angular width that decreases by a constant factor a, for each step of one wedge moving away from the focus region 420. That is, the wedges numbered 1$b$ and 8$b$ in FIG. 5 are set to angular width $\Delta\theta$, while those numbered 2 and 7 are set to angular width $a*\Delta\theta$, those numbered 3 and 6 are set to angular width $a*a*\Delta\theta$, and so on around the succession region 410. In this embodiment X need not be set explicitly; its value is simply dependent on Y, $\theta$, and the factor a. A typical value for a is 0.9, which for the three display classes listed above gives the following values of X, after rounding to the nearest even number:

Widescreen: X=42
Normal: X=14
NTSC widescreen: X=20.

In the following step 350, the formatter module 240 determines the total number of distinct channels contained in the EPG, by examining the Program column of the parsed EPG table (Table 1) stored in RAM 115. In step 355, the formatter module 240 notionally assigns a channel to the each wedge, firstly to the Y wedges of the focus region 420 and then to the X wedges of the succession region 410. Assignment of channels to wedges in the succession region 410 preferably works outwards from the focus region 420, alternating between the upper and lower portions of the succession region 410, so that the EPG display is roughly symmetrical between its upper and lower portions. The channels are assigned in a predetermined order to ensure consistency over different viewing occasions. The order is based on the listing supplied by the broadcaster.

In step 360, the formatter module 240 checks whether there are any unassigned channels. If so, in step 365 the numbers X and Y are increased until either the combined increase equals the number of unassigned channels, or they reach their permitted maximum values for the display class, in which case some channels remain unassigned. To maintain approximately the correct ratio between them, the increases in X and Y are preferably in roughly equal proportion. For example, if X=18 and Y=3 initially, as in widescreen, X would be increased by 6 for every single increment in Y.

Following step 365, in step 367 the channels are reassigned to the new wedge configuration described by the new values of X and Y. The channel numbers of any remaining unassigned channels are preferably stored in RAM 115 in a list structure called the "reserve list" for later use.

If step 360 returns "No", step 370 checks whether there are any unassigned wedges in the succession region 410. If so (i.e. there are more wedges than channels), the numbers X and Y are reduced in step 375 until either the reduction equals the number of unassigned wedges (thus preferably deleting the unassigned wedges), or they reach their permitted minimum values of 2 (for X) and 1 (for Y), in which case unassigned wedges remain. In the limiting case, where only one channel is available in the listing, as was the case in the former USSR, only one wedge will be displayed, occupying the full focus region 420. The succession region 410 then consists of two large unassigned wedges. The remaining unassigned wedges are preferably the rightmost wedges in each portion of the succession region 410. As in step 365, the reductions in X and Y are in roughly equal proportion.

Following both steps 367 and 375, the channel assigned to the wedge in the focus region 420 straddling the horizontal time axis L is known as the "focus channel". Execution proceeds to step 390 where the module divides each wedge into sub-wedges and assigns a program to each sub-wedge.

Figure 6:
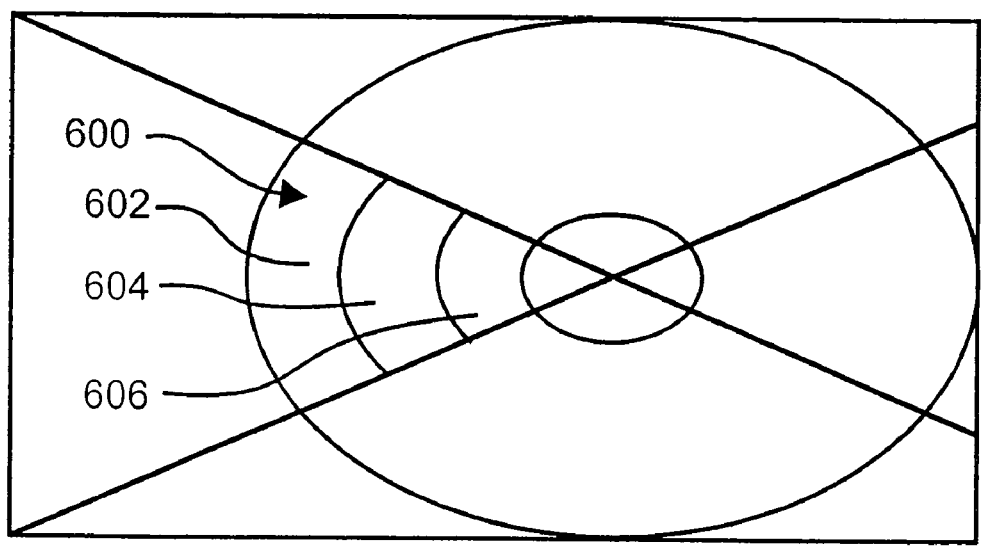
FIG. 6 illustrates the sub-wedges of the ellipses constructed according to the method of FIG. 3.

FIG. 6 shows the single wedge 600 in the focus region 420 (Y=1 in this example) divided radially into three sub-wedges 602, 604, 606. Since the radial axis represents time, the sub-wedges within a wedge are to be assigned to a set of successive individual programs on a channel. The outermost sub-wedge 602 is assigned to the program being broadcast, or commencing, on the focus channel at the focus time, known hereinafter as the "focus program".

To perform step 390, a "future time" T' needs to be set. In one implementation, T' is set to the focus time T plus a fixed duration $\Delta T$, preferably set to 90 minutes. For any radial line of the ellipse, the intersection with the outer ellipse (e.g. P for the focus channel) represents the focus time T while the intersection with the inner ellipse (e.g. Q for the focus channel) represents the future time T'.

A further useful parameter for step 390 is the "centre time" $T_c$, that is the time represented by the ellipse centre O. This depends on the ratio $\rho$ of outer to inner ellipse radii as follows:

$$T_c = \frac{\rho T' - T}{\rho - 1} \qquad (5)$$

To represent any time t between T and T', an ellipse may be drawn centred on O with horizontal and vertical radii respectively given by $$a(t) = a(T)\left(\frac{T_c - t}{T_c - T}\right) \quad (6)$$

$$b(t) = b(T)\left(\frac{T_c - t}{T_c - T}\right) \quad (7)$$

where a(T)=Range_1a and b(T)=Range_1b.

Figure 7:
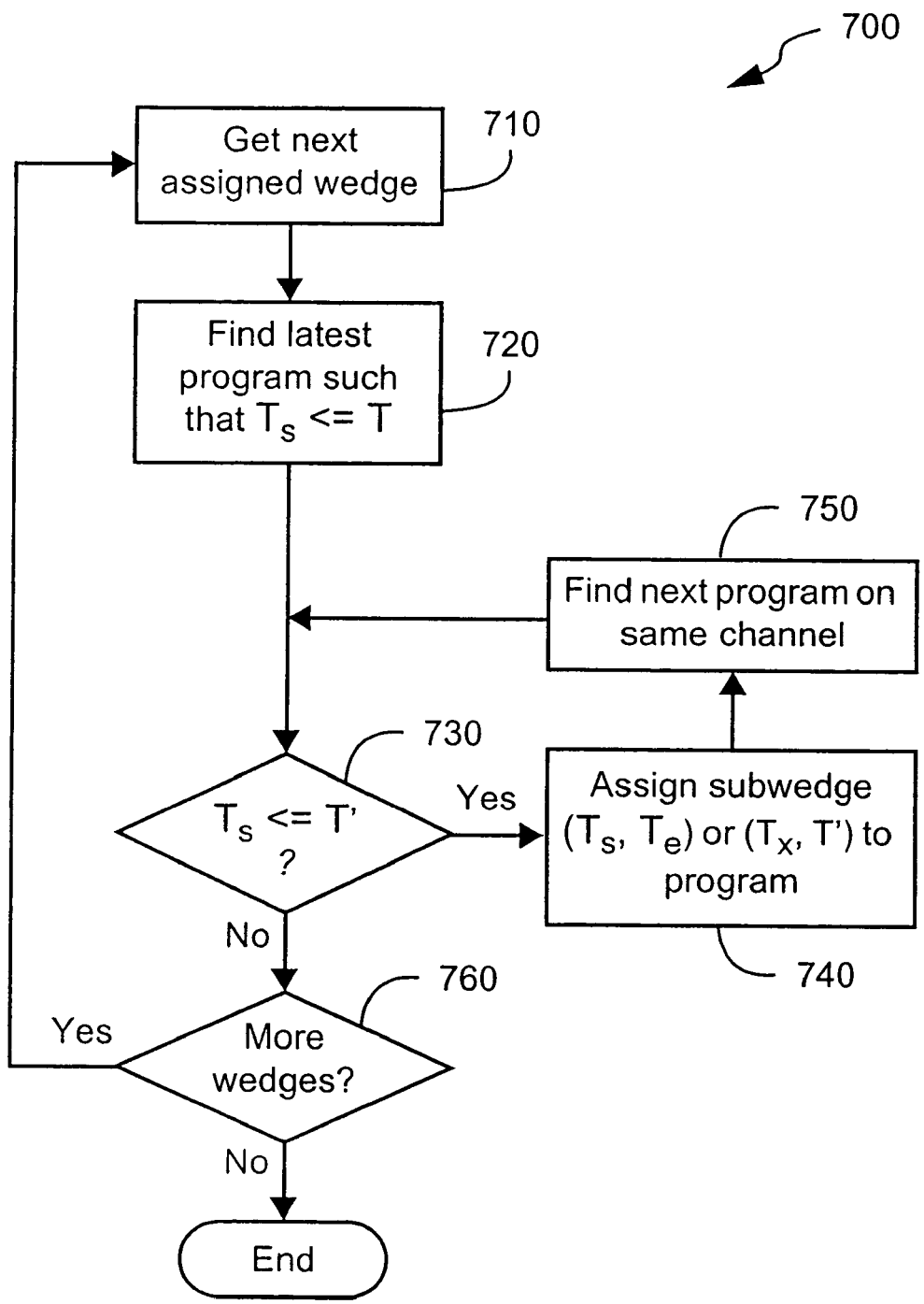
FIG. 7 is a flowchart depicting a method of assigning programs to sub-wedges as used in FIG. 3.

The flowchart in FIG. 7 shows a method 700 being an expansion of the step 390 for dividing the wedges. The inputs to method 700 are the focus time T, the future time T', and the wedge channel assignments computed in steps 355 or 367. The method 700 is performed as a loop over the assigned wedges. The method 700 starts in step 710, where the next assigned wedge, and its corresponding channel, is examined. In step 720, the method 700 finds the latest program on the corresponding channel whose start time $T_s$ is earlier than or equal to the focus time T. Execution then proceeds to step 730, where the program start time $T_s$ is compared with the future time T'. If it is determined that $T_s$ is earlier than or equal to T', in step 740 a sub-wedge spanning the time $(T_s, T_e)$, where $T_e$ is the program end time, or $(T_s, T')$, if T' is earlier than $T_e$, is created within the wedge under examination, and assigned to the program. Step 750 follows, in which the next program on the current channel is examined, and control returns to the decision step 730. If, in step 730, it is determined that $T_s$ is later than T', the method 700 proceeds to step 760, in which it is determined whether any assigned wedges remain to be examined. If so, execution returns to step 710. Otherwise, method 700 concludes.

Following step 390, in step 395 the formatter module 240 renders the EPG display to the display device 105 using the sub-wedges created and assigned in step 390. Sub-wedges inherit an angular range from their containing wedge, and start and end times from their assigned program. Step 395 uses these properties to draw each sub-wedge in the focus region 420 as follows:

(a) Construct two ellipses, one for the start time $T_s$ and one for the end time $T_e$, using Equations (6) and (7) above to obtain the horizontal and vertical radii. Mark off the annular section between the two ellipses and between the two radial lines defining the angular range. As mentioned above, the program end time $T_e$ is replaced with the future time T' if T' is earlier than $T_e$ to clip the sub-wedge to the inner ellipse.

(b) Fill in the program title within the sub-wedge. The program title is preferably aligned along the central radius of the sub-wedge. The font size F is linearly interpolated between 12 and 24 points depending on the start time $T_s$ as follows:

$$\frac{F - 12}{12} = \frac{T_s - T'}{T - T'} \quad (8)$$

Optionally, the text may be "tapered" from the outside of the sub-wedge inwards at the same angle as that of the containing wedge.

To draw each sub-wedge within the succession region 410, the same procedure is followed, except that the program start time $T_s$ is replaced by the focus time T, if T is later than $T_s$. The result is that sub-wedges representing programs in the focus region 420 extend beyond the outer ellipse, whereas those representing programs in the succession region 410 are clipped to the outer ellipse. Thus focus region 420 programs are visually distinguished from succession region 410 programs in that sub-wedges representing programs currently being broadcast give a visual indication of how much time has elapsed between the time at which the corresponding programs began, and the focus time. Through manipulation of the remote control 150, the focus time of the EPG can be controlled by the user, as discussed later in this description.

Note that the start time for the current focus program and/or new focus programs according to a user operation selected via the remote control 150, does not always need to correspond to the time at the outer ellipse (the focus time). For example, if (1) the start time for the focus program is before the time at the outer ellipse and (2) the end time for the focus program is after the time at the outer ellipse (ie. $T_s < T < T_e$), then the radial line may be extended to the start time for the focus program. The extended radial lines, and the ellipse segments corresponding to the start time and the end time form a sub-wedge. The information regarding the focus program may then be displayed in the sub-wedge. Since this information relates to the focus program, the user may readily grasp the type of program.

Optionally, the portion of the sub-wedge extending beyond the outer ellipse may be "alpha blended" over the background, so that it is rendered completely transparent at its outer extreme but with whatever opacity is used to draw the focus region 420 at the outer ellipse.

This rendered set of labelled sub-wedges forms the basic EPG display. Further preferable features of the EPG display are the following:

(c) the inner ellipse shows a "preview" of the focus program, either as a still frame or a short video segment; or alternatively, shows the logo of the focus channel;

(d) a "timeslot panel" shows the focus time and the future time;

(e) the focus channel is visually distinguished from the other channels using different fill colours and font colours;

(f) an information panel displaying EPG metadata about the focus program is shown covering the vacant region 430 of the ellipse; and (g) the EPG display is rendered semi-transparently over the display of the current program on the focus channel.

Figure 8:
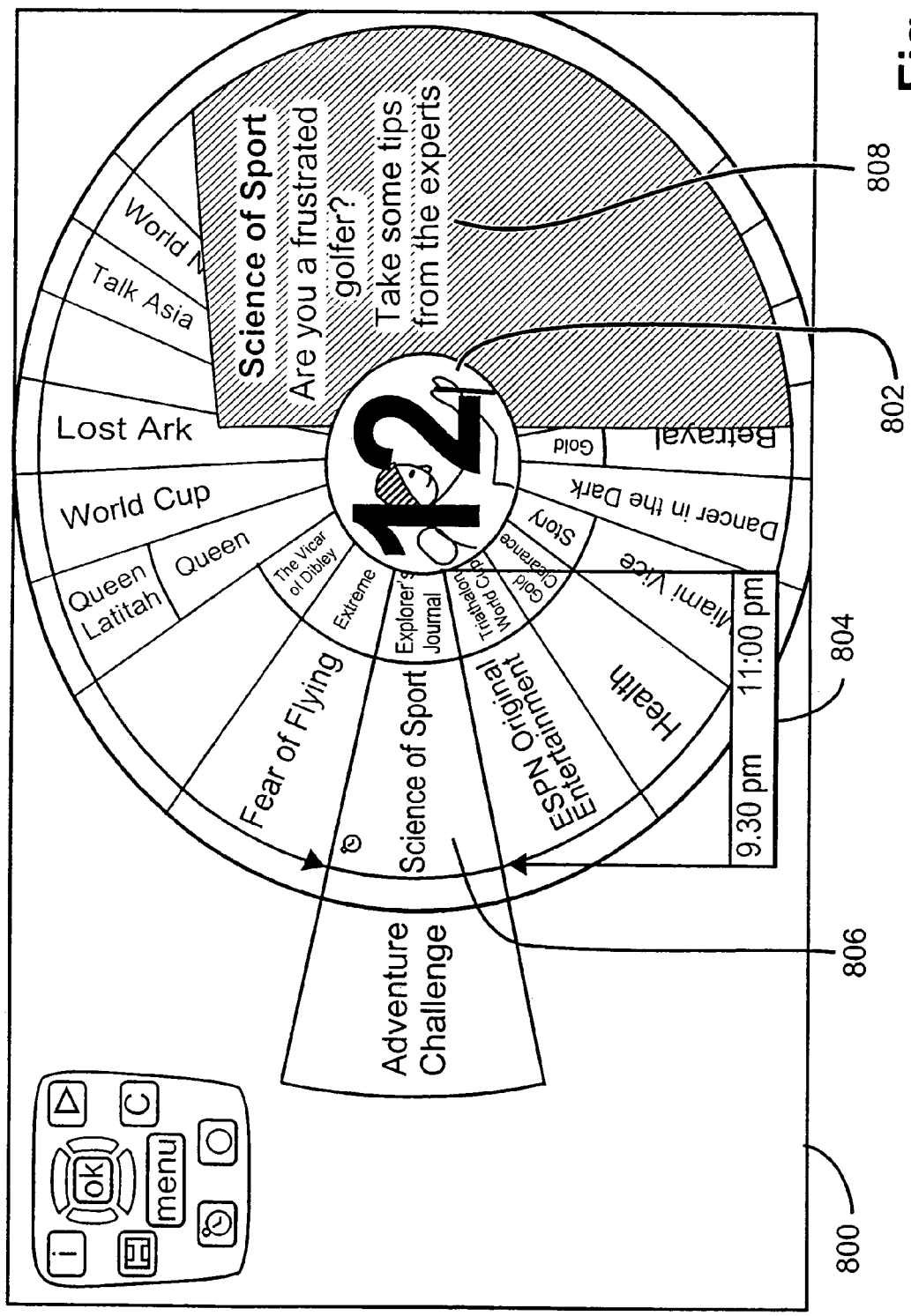
FIG. 8 shows an exemplary display of EPG data constructed according to the method of FIG. 3.

FIG. 8 shows an example of an EPG display 800 as produced by the method 300 in the widescreen display class, composited onto a neutral background. The focus program preview 802, timeslot panel 804, distinguished focus channel 806, and information panel 808 are shown. As seen in FIG. 8, the focus program preview 802 is bounded or defined by the innermost ellipse which, in this example, is almost circular. The innermost ellipse has superimposed thereon a numerical representation of the focus channel number, in this example, the channel number 12. As such, the ellipses may be used to define boundaries in which a variety of data or program content may be displayed. The focus program preview 802 may comprise the real-time content of the focus program if the focus program is presently being broadcast, or where the focus program is not presently being broadcast, a preview of that program. The preview may be a video (motion) preview or a single frame (key-frame) preview.

Returning to FIG. 2, after the formatter module 240 has constructed the display of EPG data, the viewer interface module 210 awaits further commands from the remote control 150. Commands are of two kinds: display commands, or action commands. Display commands are forwarded via the event handler module 220 to the formatter module 240 and cause the display of EPG data to change in the manner described further below with reference to FIG. 9. Action commands, such as "show", "record", "remind", are forwarded via the event handler module 220 to the action module 250 of the digital television software, where appropriate action is initiated with respect to the focus program.

In a specific implementation, four display commands are supported by the formatter module 240, those being: Up, Down, Forward, and Back. Up and Down have the effect of substantially rotating the EPG display by one wedge clockwise or anticlockwise respectively, so that the channel either above or below the present focus channel becomes the new focus channel. Forward and Back have the effect of dilating or contracting the EPG display so that the focus time is shifted forward or back respectively by at most one program interval in the focus channel. Thus, the program either following or preceding the focus program becomes the focus program. As such, by manipulating Forward and Back controls of the remote control 150 corresponding to the commands described above, the user may control the time of display of the EPG centred upon the current (focus) channel.

A method 900 of altering the display of the EPG information in response to the above described four display commands is carried out by the formatter module 240. The method 900 is stored as a software program in the ROM 110 and executed by the processor 120, and is now described with reference to FIG. 9. The method 900 starts at decision step 910, in which the nature of the display command is examined. If the command is Up, execution proceeds to step 920; if Down, to step 930; if Back, to step 940; and if Forward, to step 950.

In step 920, which is executed in response to an Up command, the channels are reassigned by one wedge in the clockwise direction. That is, in general, the channel previously assigned to wedge x is assigned to wedge (x+1), in both the focus region 420 and the succession region 410. Referring to FIG. 5, the special cases are as follows:

(i) the channel assigned to wedge X in the succession region 410 is assigned to wedge 1 in the focus region 420;

(ii) the channel assigned to wedge Y in the focus region 420 is assigned to wedge 1 in the succession region 410; and (iii) if there are unassigned wedges in the succession region 410, the channel assigned to the highest-numbered assigned wedge in the upper portion of the succession region 410 is assigned to the lowest-numbered assigned wedge in the lower portion of the succession region 410.

(iv) if there are unassigned channels, the channel assigned to wedge X/2 in the succession region 410 is unassigned, and a previously unassigned channel from the reserve list is assigned to wedge X/2+1.

Figure 10:
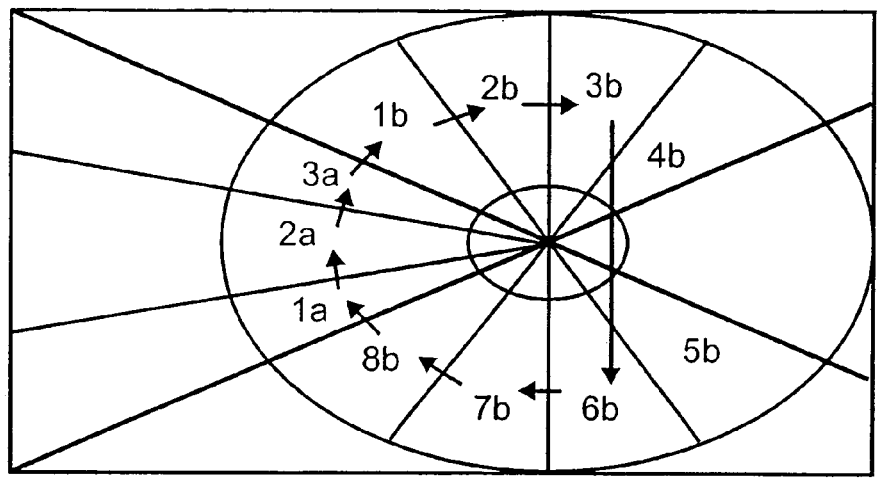
FIG. 10 illustrates the reassignment of channels to wedges in the case where there are unassigned wedges according to the method of FIG. 9.

FIG. 10 shows an example of how channels are reassigned in response to an Up command in the case where there are unassigned wedges (wedges 4b and 5b) in the succession region 410. Note that the channel assigned to wedge 3b is reassigned to wedge 6b.

Figure 11:
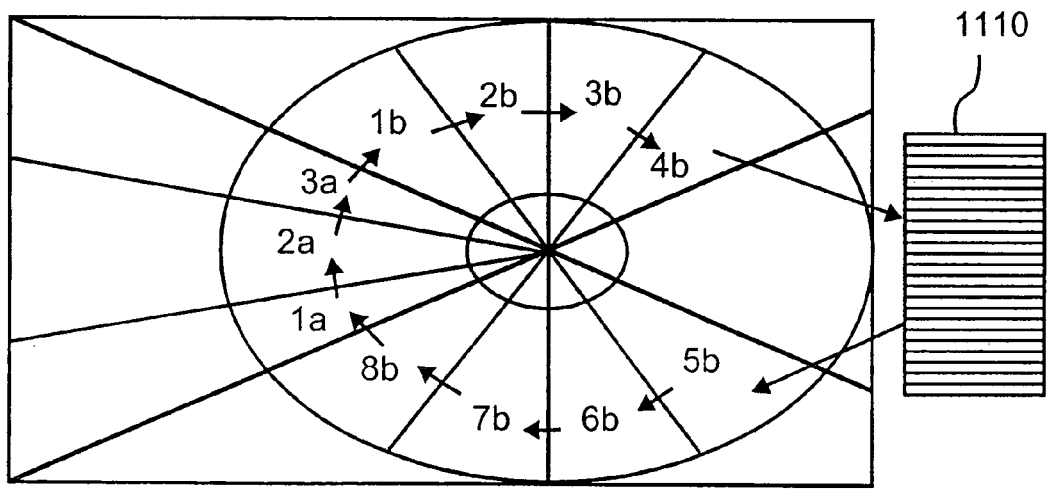
FIG. 11 further illustrates the reassignment of channels to wedges in the case where there are unassigned channels according to the method of FIG. 9.

FIG. 11 shows an example of how channels are reassigned in response to an Up command in the case where there are unassigned channels. The channel assigned to wedge 4b is de-assigned, i.e. moved to the reserve list 1110, and a previously unassigned channel from the table is assigned to wedge 5b.

In step 930, which is executed in response to a Down command, the channels are reassigned by one wedge in the anticlockwise direction. That is, in general, the channel previously assigned to wedge x is assigned to wedge (x−1), in both the focus and the succession region 410s. Certain special cases are as follows:

(i) the channel assigned to wedge 1 in the succession region 410 is assigned to wedge Y in the focus region 420;

(ii) the channel assigned to wedge 1 in the focus region 420 is assigned to wedge X in the succession region 410;

(iii) if there are unassigned wedges in the succession region 410, the channel assigned to the lowest-numbered assigned wedge in the lower portion of the succession region 410 is assigned to the highest-numbered assigned wedge in the upper portion of the succession region 410; and (iv) if there are unassigned channels, the channel assigned to wedge X/2+1 in the succession region 410 is de-assigned, and a previously unassigned channel is assigned to wedge X/2.

Using the last of these four special cases for each of Up or Down, unassigned channels enter the succession region 410 from the reserve list in response to each Up or Down command. Thus the viewer can effectively scroll though a large number of channels using limited EPG display space.

Following both steps 920 and 930, execution proceeds to step 970, in which the formatter module 240 divides each assigned wedge into sub-wedges and allocates each sub-wedge to a program in identical fashion to step 390 of the method 300. Note that if the EPG data has changed since the last display update, the steps 720 and 750 in method 700, which re-examine the EPG data, ensure the change is reflected in the updated EPG display. Finally, in step 980 the formatter module 240 renders the EPG display to the digital television screen using the sub-wedges created and assigned in step 970, as described with reference to step 395 of method 300.

In step 940, which follows step 910 in response to a Back command, the new focus program is set to be the program immediately preceding the old focus program on the focus channel. Alternatively, in response to a Forward command, the new focus program is set in step 950 to be the program immediately following the old focus program on the focus channel. In each case the new focus time T is set to the start time $T_s$ of the new focus program. Following either step 940 or step 950, execution proceeds to step 960, in which the time axis is adjusted by setting the new future time T' to the new focus time T plus the fixed duration ΔT (defined above to be 90 minutes). The centre time is also adjusted using Equation (5) with the new values of T and T'. Execution then continues to step 970 as described above.

Preferably, the transition between the original and altered states of the EPG display is animated so that the ellipse appears to rotate smoothly in the manner of a mechanical dial.

Figure 13:
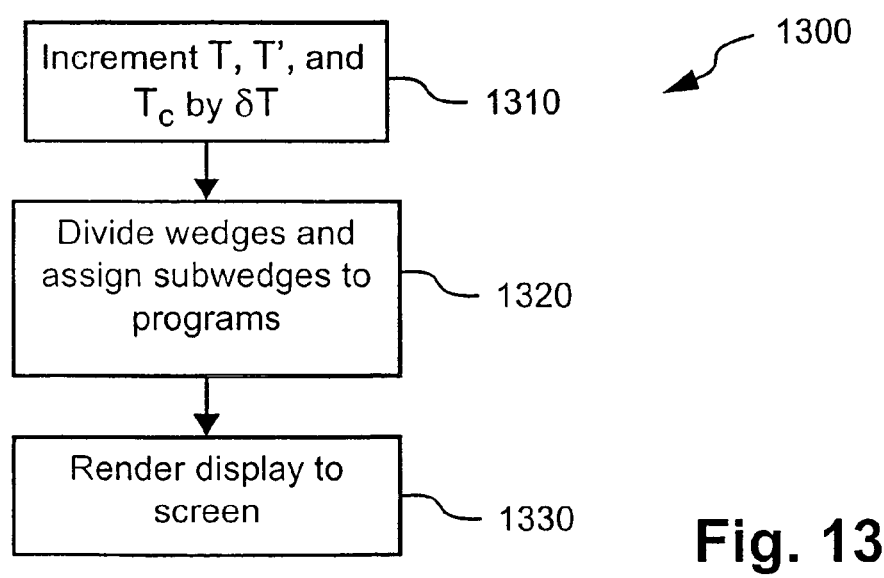
FIG. 13 is a flowchart depicting a method of updating the display of EPG data in response to a timer event.

A method 1300 of altering the display of the EPG information is now described with reference to FIG. 13. The method 1300 operates in response to a timer event originating from the timer module 260 and is carried out by the formatter module 240 having been stored as a software program in ROM 110 and executed by the processor 120. The method 1300, which is executed when the EPG display is in standby mode as described above, starts at step 1310, in which the focus time T and the future time T' are incremented by the timer interval δT, which is preferably set to 5 minutes. Note that this has the effect of incrementing the centre time $T_c$ by the same amount (see Equation (5)). In the following step 1320, the formatter module 240 divides each wedge into sub-wedges and assigns a program to each sub-wedge in identical fashion to step 390 of method 300. Following step 1320, in step 1330, the formatter module 240 renders the EPG display to the display device 105 using the sub-wedges created and assigned in step 1320, as described above with respect to step 395. Note that if the EPG data has changed since the last display update, the steps 720 and 750 in method 700, which re-examine the EPG data, ensure the change is reflected in the updated display. Preferably, the transition between the original and altered states of the EPG display is animated so that the ellipse appears to rotate smoothly in the manner of a mechanical dial.

Figure 14:
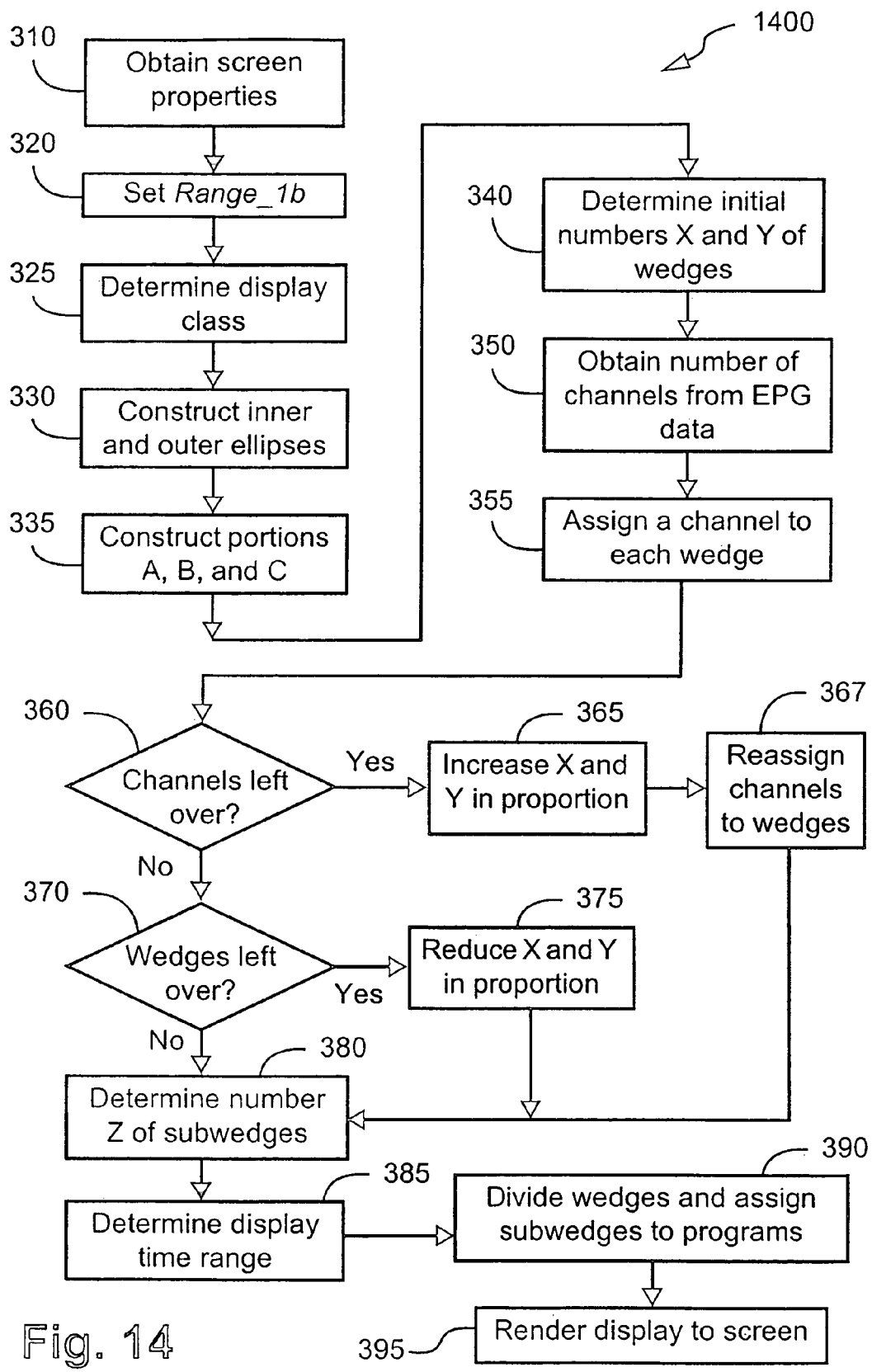
FIG. 14 is a flow chart depicting a method of formatting EPG data into a graphical display.

In an alternative implementation, a method 1400 of formatting the EPG information into a graphical representation for display is shown in FIG. 14. The method of FIG. 14 is substantially similar to the method of FIG. 3, except that an additional step 380 follows steps 370, 375, and 367. In step 380, the number Z of sub-wedges in the focus channel wedge is determined by the minimum font size required to maintain readability of the program titles at a typical viewing distance, specified to be 24 points, combined with the display resolution. The width of a subwedge is Range_$1a$*$(1-1/\rho)$/Z, which must be large enough to accommodate C characters at the minimum font size of 24 points (16 pixels for a typical display device 105). Using above values for Range_$1a$ and $\rho$, this sets the following upper limit on Z:

$$Z \max = \frac{3eH}{8*16C} \quad (9)$$

Using the values given above for H and e, and setting C to 10, the values of Zmax for the three display classes are:

Widescreen: Zmax=2.00
Normal: Zmax=1.46
NTSC widescreen: Zmax=1.26.

Thus Z is set to 2, 1, and 1 in the three display classes respectively to maintain legibility according to the alternative embodiment. In a further step 385, which follows step 380, the time axis is determined in the following manner, using the parsed EPG data table as shown for example in Table 1 and the value of Z computed in step 380:

(i) starting with the focus program, count Z programs after the focus program on the focus channel;

(ii) find the end time $T_e$ of this program, which becomes the future time T'; and (iii) compute the centre time $T_c$ using Equation (5).

Execution then proceeds to step 390 as described above with reference to FIG. 3, to divide wedges into subwedges and assign programs to the subwedges.

INDUSTRIAL APPLICABILITY

The arrangements described are applicable to the computing and information display industries and particularly where large volumes of time related data need to be presented in a viewer-friendly fashion. Such is particularly the case in the entertainment industry and for EPGs.

The foregoing describes only some embodiments of the present invention, and modifications and/or changes can be made thereto without departing from the scope and spirit of the invention, the embodiments being illustrative and not restrictive.

For example, another implementation relates to the display of search results obtained from a search engine in response to a query made over a computer network such as the World Wide Web or the Internet. The obtained results may be displayed on the radial lines of an ellipse in similar fashion to the display of programs obtained from an EPG, where the search categories are analogous to program channels and the results within a category are analogous to the programs on a channel. The search results may be navigated in similar fashion to the programs using the Up/Down and Forward/Back controls to rotate and dilate the ellipse.

Further, whilst described with specific reference to a digital television set or digital set top box, the present arrangements may be incorporated into other systems which have access to an EPG. For example, an EPG may be broadcast over a wireless analogue service where the EPG data may be derived from "teletext" data transmitted within the frame blanking period. Alternatively, for cable TV services, similar data may be similarly decoded from an EPG channel traditionally broadcast therewith. As such the described concepts may be incorporated into traditional TV sets or cable TV set top boxes.

In a further implementation, suited to interactive digital TV systems, the processing of EPG information and user commands may be performed by a computer server arrangement which is operative to stream encoded video data to the digital television receiver. The remote control used by the viewer communicates user commands via the digital TV to the server arrangement which recognizes the commands as EPG commands. Those commands are then processed by the server arrangement with the EPG data, which would be otherwise sourced from the server arrangement, according to the described methods. Once the desired EPG display (eg. FIG. 8) is formed, such may be encoded, using vector graphics or a streaming process (eg. MPEG), for transmission from the server arrangement to the digital TV for decoding and visual reproduction to the user. Further user commands may then follow resulting in an update of the EPG display or the selection of new program material for reproduction.

We claim:

1. A processor-implemented method for displaying a plurality of objects on a display device, each of the objects comprising at least a first attribute and a second attribute, said method comprising the steps of:

(a) setting a range of first attributes to be displayed on the display device;

(b) displaying on the display device a set of the plurality of objects which have the same second attribute on a radial line of an ellipse based on a comparison between the range and the first attribute of one or more of the set of objects; and (c) replacing the set of objects displayed on a radial line with a further set of objects displayed on an adjacent radial line in response to a viewer command, wherein the adjacent radial line is either clockwise or counter-clockwise adjacent depending on the sense of the viewer command, and wherein if the adjacent radial line is void of objects, the set of objects displayed on the radial line is replaced by a further set of the plurality of objects displayed on a symmetrically opposite radial line.

2. A processor-implemented method for displaying a plurality of objects on a display device, each of the objects comprising at least a first attribute and a second attribute, said method comprising the steps of:

(a) setting a range of first attributes to be displayed on the display device; and (b) displaying on the display device a set of the plurality of objects which have the same second attribute on a radial line of an ellipse based on a comparison between the range and the first attribute of one or more of the set of objects, wherein the displayed objects are each labeled with a text label derived from a title of the object, and wherein the ellipse is divided into a focus region and a succession region and the angular spacing of radial lines in each region is determined as follows:

(i) in the focus region, by the legibility of the text labels; and (ii) in the succession region, in inverse proportion to an angular distance from a central radial line of the focus region.

* * * * *